US009622274B2

(12) United States Patent
Chow

(10) Patent No.: US 9,622,274 B2
(45) Date of Patent: *Apr. 11, 2017

(54) ENHANCED SELF-ORGANIZING NETWORK SWITCHING MATRIX

(71) Applicant: AT&T MOBILITY II LLC, Atlanta, GA (US)

(72) Inventor: Gary Edward Chow, Irvine, CA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,919

(22) Filed: Apr. 29, 2016

(65) Prior Publication Data
US 2016/0249392 A1    Aug. 25, 2016

Related U.S. Application Data

(63) Continuation of application No. 14/792,120, filed on Jul. 6, 2015, now Pat. No. 9,357,428, which is a (Continued)

(51) Int. Cl.
*G01R 31/08* (2006.01)
*H04W 76/02* (2009.01)
(Continued)

(52) U.S. Cl.
CPC .......... *H04W 76/02* (2013.01); *H04W 16/28* (2013.01); *H04W 24/02* (2013.01);
(Continued)

(58) Field of Classification Search
USPC ............... 370/252–253, 328–339, 349, 352; 455/410, 422, 3.01, 426.1
See application file for complete search history.

(56) References Cited

U.S. PATENT DOCUMENTS 8,184,647 B2   5/2012  Gupta et al.
8,340,664 B2   12/2012  Tenny et al.
(Continued)

OTHER PUBLICATIONS

FOXCOM, "Optical Distributed Antenna System (DAS): BTS Hotel Application Note." Foxcom Complete RF-2-Fiber Solutions, 2009, 4 pages.
(Continued)

*Primary Examiner* — Iqbal Zaidi
(74) *Attorney, Agent, or Firm* — Amin, Turocy & Watson, LLP

(57) ABSTRACT

Automated control of simulcast ratios based on network traffic data provides efficient network capacity management. In one aspect, a remote switching matrix can be utilized at a venue to couple remote transceiver units (RTUs) with different antenna ports, for example, of one or more multi-beam antennas deployed at the venue. A simulcast ratio that can be utilized to support traffic demand at the venue can be determined and implemented by creating dynamic connections between the RTUs and the antenna ports. In one aspect, the simulcast ratio can be modified based on changes in network traffic at the venue that are monitored via self-organizing network devices. In addition, one or more antenna beams of the multi-beam antennas are remotely steered or rotated based on a location of the traffic.

20 Claims, 13 Drawing Sheets

Related U.S. Application Data continuation of application No. 14/041,532, filed on Sep. 30, 2013, now Pat. No. 9,107,187.

(51) Int. Cl.

| | | |
|---|---|---|
| *H04W 72/00* | (2009.01) | |
| *H04W 84/18* | (2009.01) | |
| *H04W 24/02* | (2009.01) | |
| *H04W 52/02* | (2009.01) | |
| *H04W 28/02* | (2009.01) | |
| *H04W 72/04* | (2009.01) | |
| *H04W 76/00* | (2009.01) | |
| *H04W 16/28* | (2009.01) | |
| *H04W 76/06* | (2009.01) | |
| *H04B 10/2575* | (2013.01) | |
| *H04W 88/08* | (2009.01) | |

(52) U.S. Cl.
CPC ..... *H04W 28/021* (2013.01); *H04W 52/0206* (2013.01); *H04W 72/005* (2013.01); *H04W 72/046* (2013.01); *H04W 76/002* (2013.01); *H04W 76/06* (2013.01); *H04W 84/18* (2013.01); *H04B 10/2575* (2013.01); *H04W 88/085* (2013.01)

(56) References Cited

U.S. PATENT DOCUMENTS

| | | | |
|---|---|---|---|
| 8,385,900 B2 | 2/2013 | Trigui | |
| 8,437,764 B2 | 5/2013 | Doettling et al. | |
| 8,498,207 B2 | 7/2013 | Trigui et al. | |
| 2005/0059437 A1 | 3/2005 | Son et al. | |
| 2006/0099987 A1 | 5/2006 | Singh et al. | |
| 2006/0258395 A1* | 11/2006 | Cave | H04W 72/02 455/552.1 |
| 2009/0312022 A1 | 12/2009 | Viorel et al. | |
| 2010/0111013 A1 | 5/2010 | Chou | |
| 2010/0128676 A1* | 5/2010 | Wu | H04L 45/308 370/328 |
| 2010/0272218 A1 | 10/2010 | Yeh et al. | |
| 2011/0092220 A1 | 4/2011 | Bernini et al. | |
| 2011/0249558 A1 | 10/2011 | Raaf et al. | |
| 2011/0294527 A1 | 12/2011 | Brueck et al. | |
| 2011/0300871 A1 | 12/2011 | Dottling et al. | |
| 2012/0258732 A1 | 10/2012 | Jeong | |
| 2012/0307697 A1 | 12/2012 | Mukhopadhyay | |
| 2013/0028126 A1 | 1/2013 | Kazmi | |
| 2013/0095811 A1 | 4/2013 | Okino | |
| 2013/0170474 A1 | 7/2013 | Bi et al. | |
| 2013/0316710 A1* | 11/2013 | Maaref | H04W 16/10 455/436 |
| 2014/0147125 A1* | 5/2014 | Chow | H04W 16/00 398/115 |

OTHER PUBLICATIONS

FOXCOM, "Optical Distributed Antenna System (DAS): DAS Stadium Coverage Application Note." Foxcom Complete RF-2-Fiber Solutions, 2009, 8 pages.

William S. Hortos, "Cascaded neural networks for sequenced propagation estimation,multiuser detection, and adaptive radio resource control of third-generation wireless networks for multimedia services." SPIE Conference on Aoplications and Science of ComutationalIntelligence II, Orlando, Florida, Apr. 1999, pp. 261-275.

William S. Hortos, "Self-organizing feature maps for dynamic control of radio resources in CDMA microcellular networks." Aerospace/Defense Sensing and Controls, 1998, pp. 378-391.

Wunder et al. "Self-Organizing Distributed Inter-Cell Beam Coordination in Cellular Networks with Best Effort Traffic." 2010 Proceedings of the 8th International Symposium on Modeling and Optimization in Mobile, Ad Hoc and wireless Networks (WiOpt), 2010, pp. 295-302.

Blume, et al. "Energy Savings in Mobile Networks Based on Adaptation to Traffic Statistics." Bell Labs Technical Journal 15(2), 2010, pp. 77-94.

Non-Final Office Action dated Aug. 28, 2014 for U.S. Appl. No. 13/689,328, 47 pages.

Non-Final Office Action dated Oct. 22, 2014 for U.S. Appl. No. 14/041,532, 36 pages.

Final Office Action dated Nov. 18, 2014 for U.S. Appl. No. 13/689,328, 42 pages.

Non-Final Office Action dated Mar. 10, 2015 for U.S. Appl. No. 13/689,328, 50 pages.

Final Office Action dated Aug. 31, 2015 for U.S. Appl. No. 13/689,328, 52 pages.

Non-Final Office Action mailed Nov. 4, 2015 for U.S. Appl. No. 14/792,120, 43 pages.

U.S. Appl. No. 14/792,120, filed Jul. 6, 2015.
U.S. Appl. No. 14/041,532, filed Sep. 30, 2013.

* cited by examiner

ENHANCED SELF-ORGANIZING NETWORK SWITCHING MATRIX

RELATED APPLICATION

This patent application is a continuation of, and claims priority to each of, U.S. patent application Ser. No. 14/792,120, filed Jul. 6, 2015, and entitled "ENHANCED SELF-ORGANIZING NETWORK SWITCHING MATRIX", which is a continuation of U.S. patent application Ser. No. 14/041,532, filed Sep. 30, 2013, and entitled "ENHANCED SELF-ORGANIZING NETWORK SWITCHING MATRIX." The entireties of the foregoing applications are hereby incorporated by reference herein.

TECHNICAL FIELD

The subject disclosure relates to wireless communications, e.g., to an enhanced self-organizing network switching matrix.

BACKGROUND

With explosive growth in utilization of communication devices, mobile telecommunications carriers are seeing an exponential increase in network traffic. Temporary high traffic demand in certain locations (e.g., convention centers, sports venues such as stadiums or arenas, hotel ballrooms, and other similar areas) can exponentially increase network traffic and cause voice and data congestion on event days or during other high traffic periods. To meet these demands of higher traffic and reduce congestion, communication service providers can deploy additional macro sites or a distributed antenna systems at the locations; however, these are dedicated fixed network assets at additional cost requiring the transport of equipment and installation. Often times, this fixed equipment will sit idle or underutilized if an event is not occurring or if it is outside the location's high traffic window. For example, deployed network assets at a football stadium can sit idle during the long offseason or during the week when a game is not being played.

DETAILED DESCRIPTION

Figure 1:
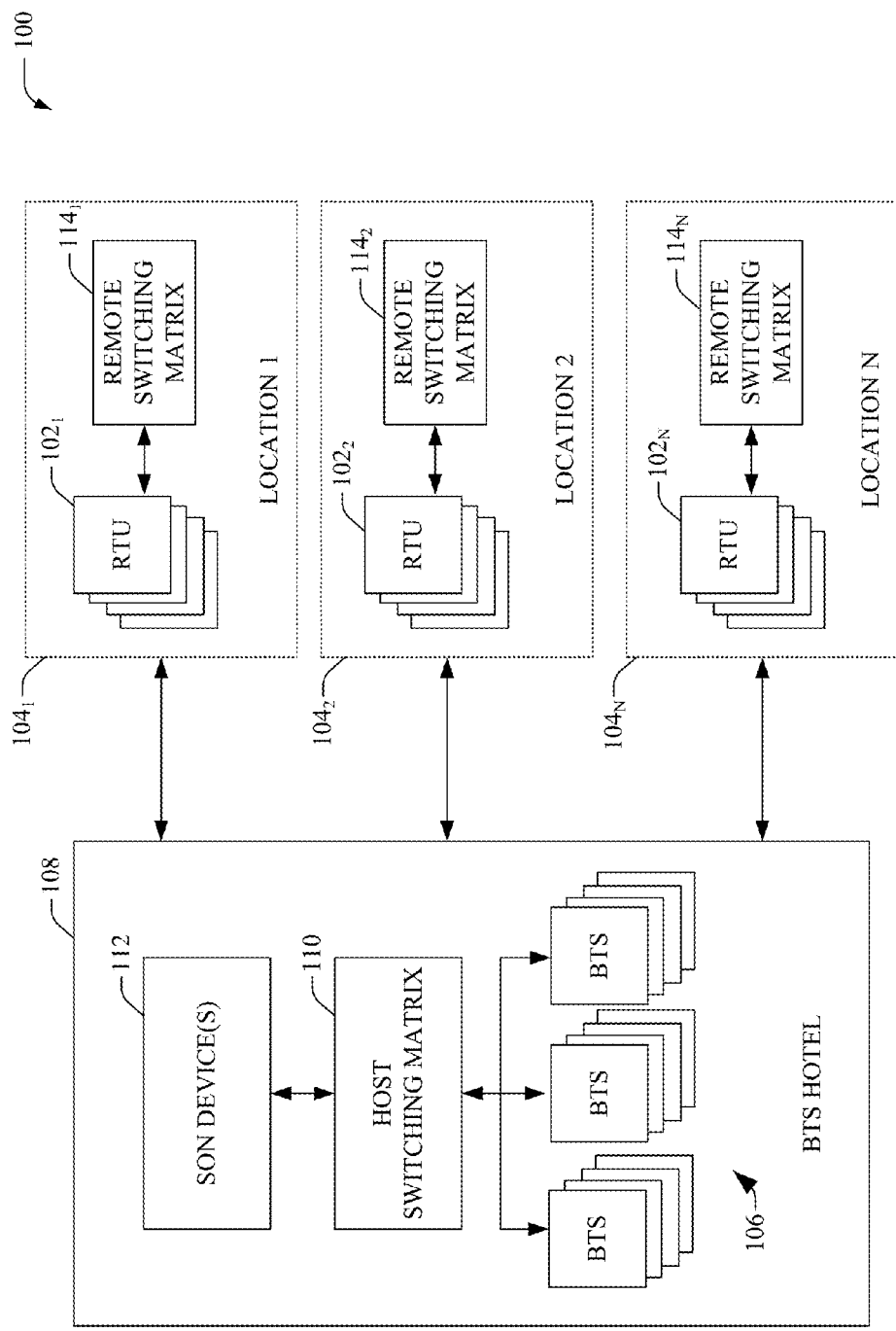
FIG. 1 illustrates an example system that facilitates on-demand capacity allocation in a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "matrix," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary"

is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile terminal," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies.

Locations, such as, but not limited to, stadiums, convention centers, hotels, arenas, etc. can experience very high network traffic demand during a specific time period, for example, when an event is scheduled. To meet the demands of higher traffic and reduce congestion, additional macro sites or a distributed antenna systems can be deployed at the locations. However, these dedicated fixed network assets substantially increase installation and/or operating costs. Further, the network assets can be underutilized during times of lower demand. In addition, the same network assets may congest during very high traffic periods because the deployed fixed network assets are insufficient to handle the amount of traffic generated when events are taking place. For example, some football stadiums can hold over a hundred thousand fans, where any number of those fans may wish to access network services at any one time using a smart phone, a tablet, etc. While a system can be designed for the high capacity demand and to overprovision to handle the peak traffic periods or to accept that congestion will occur during peak traffic periods, either way at corresponding increased cost related to the over provisioning.

Various embodiments of a self-organizing network (SON) switching matrix are provided, e.g., that allow a communications service provider to pool network resources at a centralized location and schedule network resources out to different locations (e.g., stadiums, hotel ballrooms, and/or other high traffic areas) based on traffic conditions. By allocating network assets on-demand, capacity can be scaled at a centralized location or multiple centralized locations to match the changing traffic demands. Using remotely located remote transceiver units (RTUs), the SON switching matrix can monitor traffic, and can adjust which RTUs are active or dormant, by quickly splitting and de-splitting network resources to bring in additional capacity into an area when needed, and when traffic demand subsides, reallocating those resources elsewhere in the network. In one aspect, sectorization and/or desectorization of an area (e.g., venue space) can be controlled based on real time (or near real time) traffic demand data. By automating sector splitting and de-splitting, additional capacity can be provided into an area when needed and, when traffic demand subsides, reallocated elsewhere in the network where traffic demand is rising. It is noted that the SON switching matrix facilitates automated capacity management providing just in time network dimensioning. In one example, the SON switching matrix can comprise a host and/or one or more remote switching matrices, as explained in detail infra.

Referring initially to FIG. 1, there illustrated is an example system 100 that facilitates on-demand capacity allocation in a communication network, according to one or more aspects of the disclosed subject matter. System 100 can be coupled to and/or part of a self-organizing network (SON). In one aspect, system 100 facilitates automated network capacity management by sectorizing and desectorizing a venue space or other network area through the use of active and dormant remote transceiver units (RTUs) $102_1$-$102_N$ (wherein N is most any positive integer) deployed at different locations $104_1$-$104_N$ and a centralized pool of base transceiver station (BTS) equipment 106 deployed in a BTS hotel 108.

The BTS hotel 108 can include a host switching matrix 110 that couples the set of BTSs 106 with one or more of the RTUs $102_1$-$102_N$, for example, by employing an optic fiber connection. It is noted that other ways to communicatively couple disparately located BTS assets and RTUs can also be used. As an example, the host switching matrix 110 can comprise an optical switch that can create dynamic optical connections between the BTSs 106 and one or more of the RTUs $102_1$-$102_N$. In one aspect, the host switching matrix 110 can control, in real time, which of the RTUs $102_1$-$102_N$ are to be activated, e.g., can receive a radio simulcast from a BTS 106 of the BTS hotel 108, and which of the RTUs $102_1$-$102_N$ are to be deactivated (or left in a dormant state), e.g., not sent a radio simulcast from a BTS 106 of the BTS hotel 108. Moreover, the control is based on real-time (or near real-time) traffic demand, for example, determined by the SON device(s) 112. For example, prior to an event at a stadium, the host switching matrix 110 can activate little to none of the RTUs at both the parking lot area and the stadium area. Before the event, the host switching matrix 110 can determine increased network demand (e.g., based on data received from the SON device(s) 112) in the parking lot, and accordingly, increase the amount of active RTUs in the parking lot area. Similarly, as people enter the stadium area, and demand for network services increases within the stadium area (e.g., determined based on data received from the SON device(s) 112), additional RTUs deployed at the stadium can be made active. When activity in the stadium area, or the parking lot area, change independent of one another, a ratio of active to dormant remote transceiver units can be adjusted to meet demand. It is noted that the host switching matrix 110 allows the communication provider to deploy their assets more efficiently by pooling and scheduling out their resources, from the BTS hotel 108, rather than having network assets sit idle for days or even months at a time. In addition, by pooling assets at a centralized location, costs can be saved, for example, on real estate ground leases needed to house network equipment.

Further, once the RTUs at a specific location (e.g., RTUs $102_1$ at location 1 $104_1$) have been activated, a remote switching matrix (e.g., $114_1$) can be utilized to automate the simulcast ratios to essentially bisector or sector split venue sectors based on traffic demands (e.g., determined based on data received from the SON device(s) 112). Accordingly, the number of sector carriers, downlink (DL) codes and/or DL power can be adjusted. In one aspect, the remote switching matrices $114_1$-$114_N$ can include an radio frequency (RF) switch that can be utilized to create dynamic RF connections between the RTUs $102_1$-$102_N$ and one or more multi-beam antenna ports (not shown). The remote switching matrices $114_1$-$114_N$ can control the simulcast ratios so that the coverage footprints of the multi-beam antennas remain the same during the sectorization and/or desectorization process. It is noted that the remote switching matrices $114_1$-$114_N$ allow the communication provider to deploy a fewer number of RTUs and/or antennas at the different locations, thereby saving substantial costs.

Additionally or optionally, the host switching matrix 110 and/or the remote switching matrices $114_1$-$114_N$ can facilitate remote azimuth steering based on traffic demand data, for example, received from the SON device(s) 112. Moreover, multiple beams of the antennas that are coupled to the RTUs $102_1$-$102_N$ can be remotely steered and/or rotated based on instructions received from the host switching matrix 110 and/or the remote switching matrices $114_1$-$114_N$. As an example, an antenna beams can be steered through a coverage area of a multi-beam antenna footprint based on where the traffic is the greatest (e.g., in contrast to covering the entire footprint at once).

It is noted that although FIG. 1 depicts the same number of RTUs $102_1$-$102_N$ deployed at each location $104_1$-$104_N$, the same or different number of RTUs $102_1$-$102_N$ can be deployed at different venues. Moreover, the number of RTUs $102_1$-$102_N$ deployed at a specific venue can be determined based on capacity/traffic demands (e.g., observed over time). Further, although depicted as residing within the BTS hotel 108, the host switching matrix 110 and/or the SON device(s) 112 can reside anywhere in the communication network and be locally (and/or remotely) coupled to the BTS hotel 108.

Figure 2:
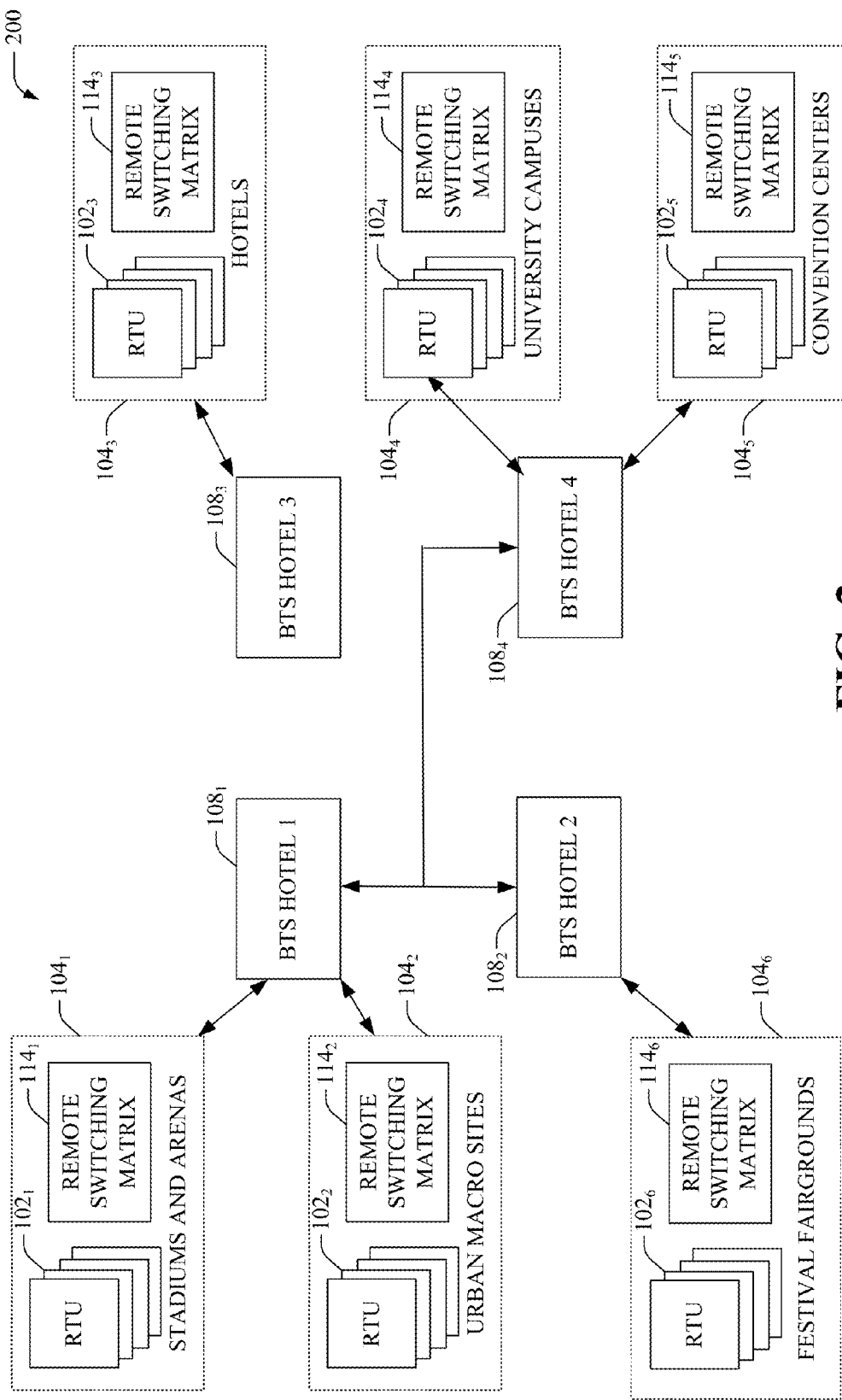
FIG. 2 illustrates an example system that aggregates base transceiver station (BTS) hotels for automated network capacity management.

Referring now to FIG. 2, there illustrated is an example system 200 that aggregates BTS hotels for management of network capacity, in accordance with an aspect of the subject disclosure. It is noted that the BTS hotels $108_1$-$108_4$ are substantially similar to BTS hotel 108 and can include functionality as more fully described herein, for example, as described above with regard to BTS hotel 108. Further, RTUs $102_1$-$102_4$ and remote switching matrices $114_1$-$114_4$ can include functionality as more fully described herein, for example, as described above with regard to RTUs $102_1$-$102_N$ and remote switching matrices $114_1$-$114_N$ respectively. Furthermore, it is noted that FIG. 2 depicts only one example network architecture and the subject specification is not limited to four BTS hotels coupled to six venues respectively. Moreover, more or less BTS hotels can be deployed within a communication network and each BTS hotel can be coupled to more or less venues.

In one aspect, the BTS hotels $108_1$-$108_4$ can be coupled (e.g., via respective host switching matrices) to various venues, such as, but not limited to, stadiums and arenas $104_1$, large urban macro sites $104_2$, hotels $104_3$, university campuses $104_4$, convention centers $104_5$, and/or festival fairgrounds $104_6$. However, a single BTS hotel or a single centralized location does not have to serve the entirety of network assets in a region (e.g., as depicted in system 100). In FIG. 2, four separate BTS hotels are deployed within the network to pool assets together. In this scenario, for example, if BTS hotel 1 ($108_1$) does not have the capacity to serve all active remote transceiver units at stadiums and arenas and urban macro site, BTS assets from BTS hotel 2 ($108_2$) and/or BTS hotel 4 ($108_4$) can be shared by BTS hotel 1 ($108_1$). In another example, BTS hotel 3 ($108_3$) can be deployed outside the shared pool of resources of BTS hotels 1, 2, and 4 ($108_1$, $108_2$, and $108_4$) and dedicate its resources to a singular location (e.g. hotels) and/or multiple locations (not shown). It is noted that many different possible configurations are available for communication service providers to both maximize the efficient use of network resources while providing a positive experience to user equipment (UE) accessing those network resources and that the subject specification is not limited to the architectures illustrated in FIGS. 1 and 2.

Figure 3:
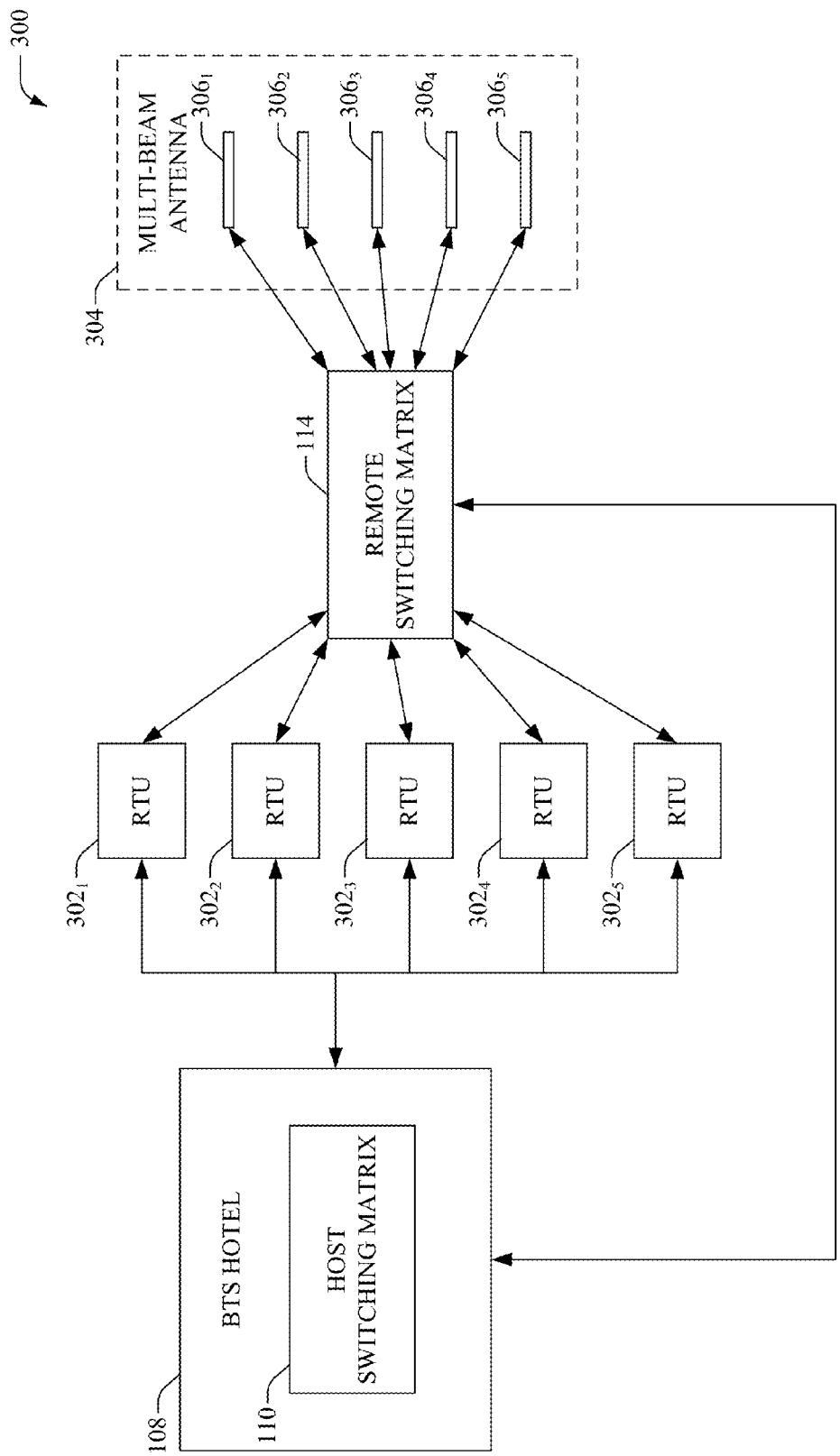
FIG. 3 illustrates an example system that controls simulcast ratios associated with remote transceiver units (RTUs) to facilitate efficient network capacity management.

Referring now to FIG. 3, there illustrated is an example system 300 that controls simulcast ratios of RTUs to facilitate efficient network capacity management, according to an aspect of the subject disclosure. It is noted that the BTS hotel 108, the host switching matrix 110 and the remote switching matrix 114 can include functionality as more fully described herein, for example, as described above with regard to systems 100 and 200. Further, RTUs $302_1$-$302_5$ are substantially similar to RTUs $102_1$-$102_N$ and can include functionality as more fully described herein with regard to the RTUs $102_1$-$102_N$.

According to one aspect, the host switching matrix 110 can select and activate one or more of the dormant RTUs $302_1$-$302_5$ based on traffic data, for example, received from a SON device. Moreover, the host switching matrix 110 can connect the selected RTUs $302_1$-$302_5$ to BTS equipment deployed at the BTS hotel 108. In one aspect, the RTUs $302_1$-$302_5$ can receive digital communication signals from the BTS equipment, for example, via an optical link. The RTUs $302_1$-$302_5$ can convert the digital communication signal to RF signals that can be transmitted to a multi-beam antenna 304. Moreover, the RTUs $302_1$-$302_5$ can upconvert and/or amplify the digital communication signals on the downlink path (e.g., from antenna to user equipment). Further, the RTUs $302_1$-$302_5$ can receive RF signals from the multi-beam antenna 304 on the uplink path (e.g., from user equipment to antenna) and convert the RF signals to a digital signal that can be transmitted back to the BTS equipment via the optical link. As an example, the RTUs $302_1$-$302_5$ can include a low noise amplifier (LNA) that processes the RF signals and facilitates down-conversion and digitization of RF signals.

In one embodiment, the remote switching matrix 114 can be employed to create dynamic RF connections between RTUs $302_1$-$302_5$ and the antenna ports $306_1$-$306_5$ of the multi-beam antenna 304. Moreover, the dynamic RF connections are created in a manner such that the simulcast ratio is modified to provide optimal capacity. For example, the remote switching matrix 114 can automatically adjust the simulcast ratio of the RTUs $302_1$-$302_5$ from n:1 to 1:1 back to n:1 (wherein "n" is an integer greater than 1) by changing the RF connections between the remote radio heads and the antenna ports in any simulcast combination. Moreover, the remote switching matrix 114 can change the physical network topology by essentially converting an omni site into a three sectored site, and progressively to a six sectored site, twelve sectored site, twenty four sectored sites, etc. and back again to an omni site based on traffic demand (e.g., determined based on data received from SON device(s)) by automatically adjusting the simulcast ratio of the RTUs $302_1$-$302_5$. For example, as the traffic demands increase, the number of sectors is increased and as the traffic demands decrease, the number of sectors is decreased. The RTUs $302_1$-$302_5$ are deployed throughout the location (e.g., venue) to provide complete network coverage in n:1 simulcast ratio or omni coverage. According to an aspect, the remote switching matrix 114 does not change the coverage but modifies the simulcast ratio of the RTUs $302_1$-$302_5$ from n:1 to 1:1 back to n:1. As an example, a simulcast ratio of 1:1 corresponds to the maximum sectorization of the venue space, which will vary based on the total number of RTUs $302_1$-$302_5$ deployed at the location or area of coverage.

Accordingly, the remote switching matrix 114 allows sectorization and desectorization to occur at the remote-end using fewer number of RTUs (e.g., RTUs $302_1$-$302_5$) and a fewer number of antennas (e.g., 304) while preserving the RF coverage footprint at the venue or area of coverage. As an example, the remote switching matrix 114 can adjust the simulcast ratio of outdoor distributed antenna system (oDAS) deployments on university campuses based on traffic load or time of day to support football games and/or concerts in common areas during the day and then shift the capacity over to the student housing areas in the evenings. In another example, the remote switching matrix 114 can adjust the simulcast ratio of indoor distributed antenna system (iDAS) deployments in large convention center ballrooms for events where unusual crowding occurs or to automatically allocate additional resources to support high data volume activities and demonstrations through automated sector splitting. In one aspect, the remote switching matrix 114 can have remote-end SON functionality and/or connect back to the host-end SON at the central office (e.g., BTS hotel) or cell site to receive data related to traffic demand at the location.

Although only five RTUs $302_1$-$302_5$ and one multi-beam antenna 304 are depicted in FIG. 3, it can be noted that one or more RTUs and/or antennas can be deployed at the remote locations. Further, although a multi-beam antenna 304 is depicted in FIG. 3, it can be noted that the subject specification is not limited to utilization of a multi-beam antenna and that one or more single-beam, twin-beam, or multi-beam antennas can be deployed at the remote location. In addition, the subject specification is not limited to a 1×5 multi-beam antenna and multi-beam antennas having most any configuration, such as but not limited to 1×5, 1×9, and/or 2×9 multi-beam antennas can be utilized.

Figure 4:
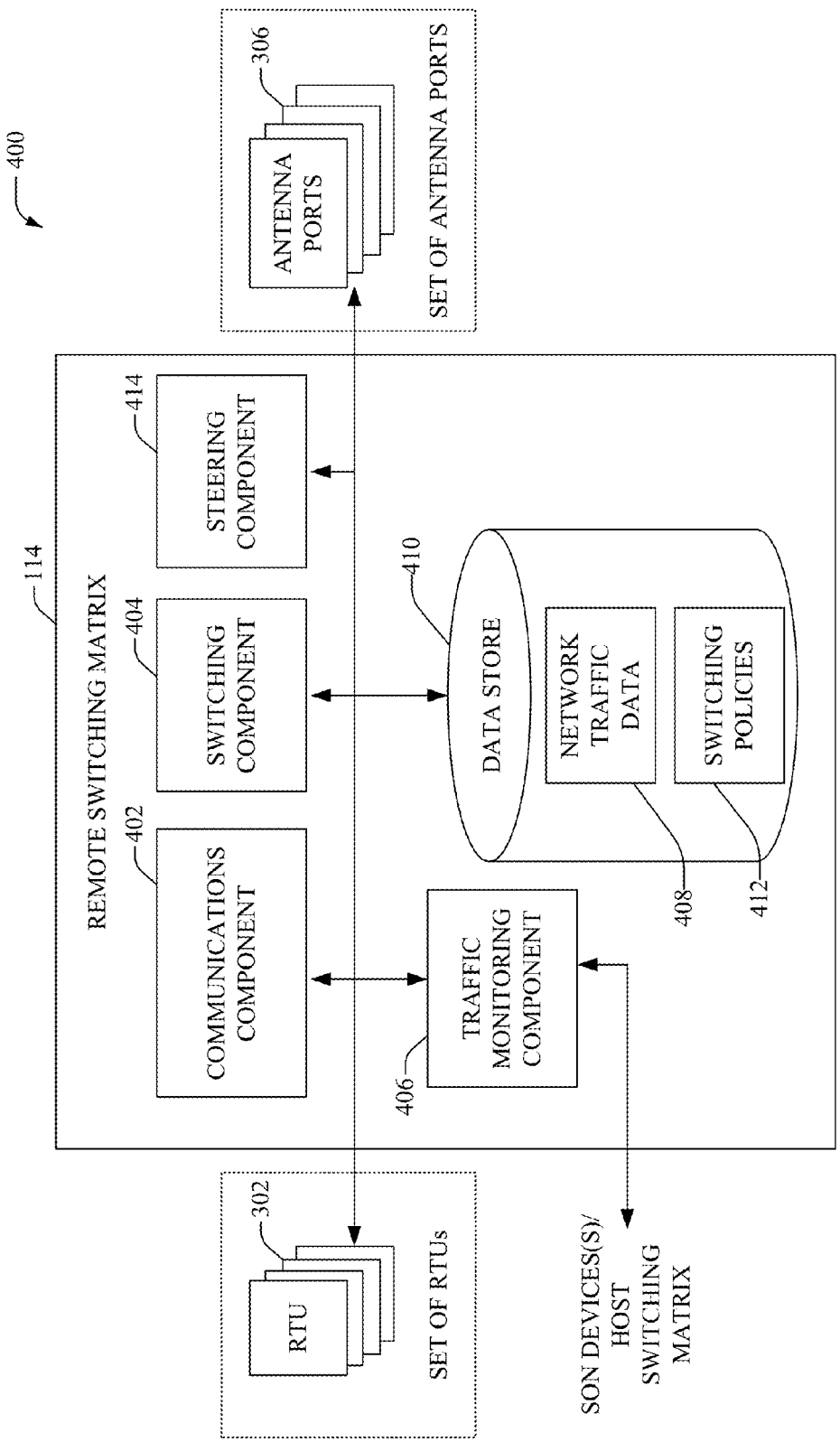
FIG. 4 illustrates an example system that comprises a remote switching matrix for automated network capacity management.

Referring now to FIG. 4, there illustrated is an example system 400 that comprises a remote switching matrix for automated network capacity management, according to one or more aspects of the disclosed subject matter. It can be noted that the remote switching matrix 114 can include functionality as more fully described herein, for example, as described above with regard to systems 100-300. Further, the set of RTUs 302 and the set of antenna ports 306 are substantially similar to and include functionality as more fully described herein with respect to RTUs $302_1$-$302_5$ and antenna ports $306_1$-$306_5$ respectively. In one aspect, the remote switching matrix 114 can control the simulcast ratio of the RTUs $302_1$-$302_5$ to essentially bisector or sector split venue sectors based on real-time (or near real-time) traffic demands. The additional sectors can provide more DL codes and DL power in high traffic areas.

According to an embodiment, the remote switching matrix 114 can include a communications component 402, a switching component 404, a traffic monitoring component 406, and/or a data store 410. The communications component 402 can exchange communications data with a set of RTUs 302. In an aspect, the communication data can be sent to/received from centrally located/shared BTS equipment via the RTUs 302. As an example, the communications data includes a radio simulcast. It is noted that the radio simulcast can provide a network signal and route network resources necessary for a remote transceiver unit to provide communication services to a user equipment. Further, the communications component 402 can exchange the communications data with a set of antenna via a set of antenna ports to facilitate communication with one or more UE within the coverage area.

A traffic monitoring component 406 can determine real-time (or substantially real-time) network traffic and/or traffic demands at an area in which at the antennas are deployed. In one aspect, the network traffic and/or traffic demand data can be received from a host switching matrix (e.g., host switching matrix 110) and/or from one or more devices of a SON (e.g., SON devices 112) that monitor and/or predict changes in network traffic within the area. In another aspect, the traffic monitoring component 406 can also determine network traffic based on monitoring the exchange of communications data with the RTUs 302 and/or the antenna ports 306. The determined and/or received network traffic data 408 can be stored within the data store 410 that resides within (or is coupled to) the remote switching matrix 114. It is noted that the data store 410 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Further, the remote switching matrix 114 can comprise a switching component 404 that can dynamically create RF connections to couple the RTUs 302 with corresponding antenna ports 306 in a specific simulcast combination (e.g., to support the traffic/capacity demands at the location). As an example, the simulcast combination can be determined by the switching component 404 based on an analysis of the network traffic data 408 and/or switching policies (e.g., time or day, date, event schedule, etc.). In another example, the simulcast combination can be determined by the host switching matrix (e.g., host switching matrix 110) and instructions to implement the specific simulcast combination can be received (e.g., by the traffic monitoring component 406) from the host switching matrix. Moreover, the switching component 404 can automatically adjust the simulcast ratio of the RTUs 302 from n:1 to 1:1 back to n:1 by making different RF connections between the RTUs 302 and the antenna ports 306 in the specified simulcast combination. For example, as the traffic demands at the location increase, the switching component 404 can increase sectorization of the antennas, for example, by increasing the number of ports 306 to which the RTUs 302 are coupled and accordingly, converting an omni site into a three sectored site, and progressively to a six sectored site, twelve sectored site, twenty four sectored site, etc. (and vice versa).

Additionally (or optionally), the remote switching matrix 114 can comprise steering component 414 that facilitates beam steering of a multi-beam antenna such that antenna beams are steered or rotated through the coverage area of the multi-beam antenna footprint based on where the traffic is located (or traffic demand is the greatest). The location of the traffic can be received by the traffic monitoring component 406, for example, from the host switching matrix (e.g., host switching matrix 110) and/or the SON devices (e.g., SON devices 112). Additionally or alternatively, the host switching matrix can determine the beam steering parameters and instruct the steering component 414 to implement beam steering based on the determined beam steering parameters.

Figure 5:
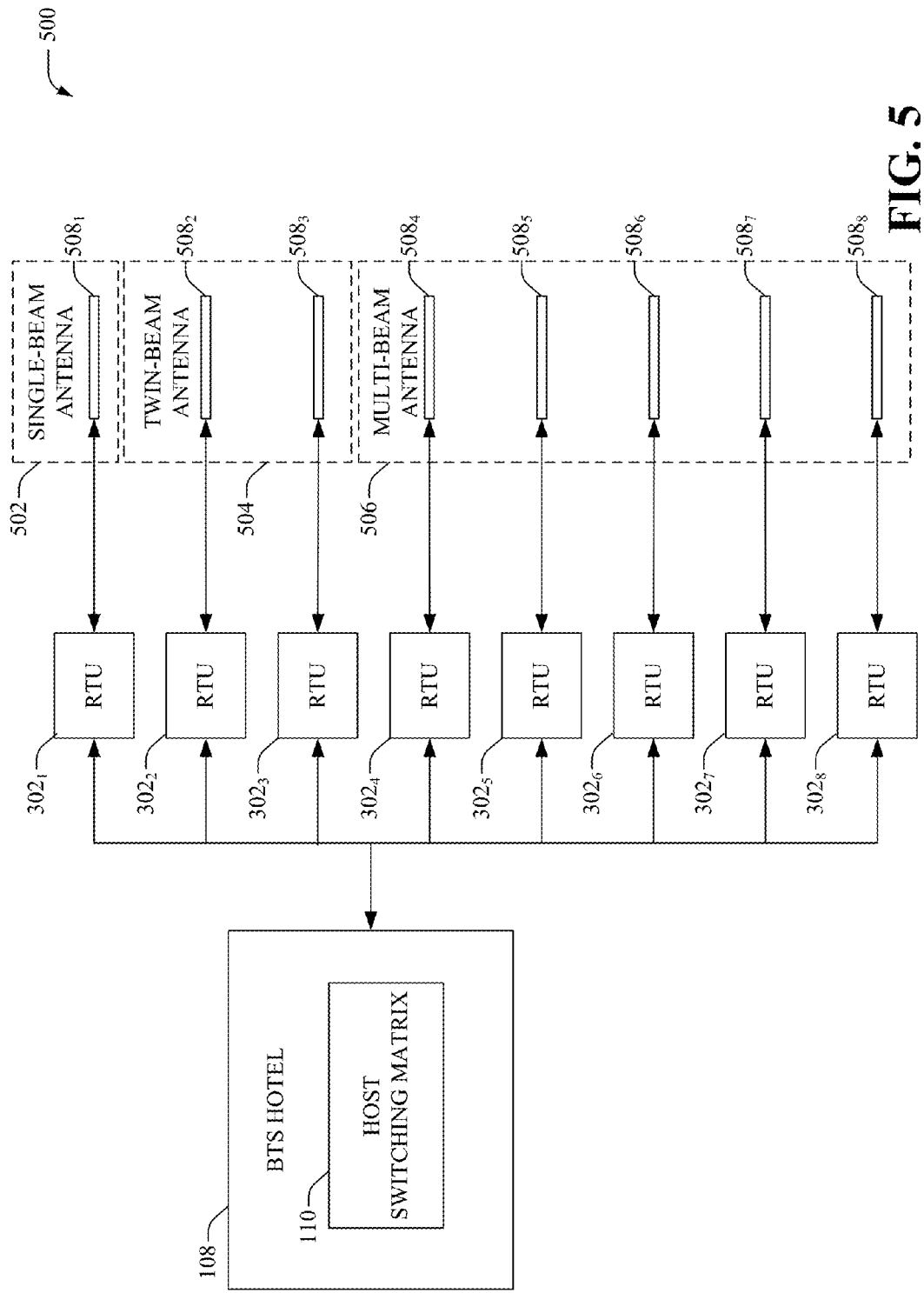
FIG. 5 illustrates an example system that controls physical network topology to facilitate efficient network capacity management.

FIG. 5 illustrates an example system 500 that controls physical network topology to facilitate efficient network capacity management, according to an aspect of the subject disclosure. It can be noted that the BTS hotel 108 and the host switching matrix 110 can include functionality as more fully described herein, for example, as described above with regard to systems 100-400. Further, the RTUs $302_1$-$302_8$ are substantially similar to and include functionality as more fully described herein with respect to RTUs 302.

In this example system, the host switching matrix 110 can control (e.g., based on network traffic data) the simulcast ratios of the RTUs $302_1$-$302_8$, without utilization of a remote switching matrix (e.g., remote switching matrix 114 as depicted in FIG. 3). Moreover, in this example embodiment, the RTUs $302_1$-$302_8$ can be hard-cabled directly to respective antenna ports $508_1$-$508_8$ of different antennas, for example, a single-beam antenna 502, a twin-beam antenna 504, and/or multi-beam antenna 506. In one aspect, the host switching matrix 110 can change the simulcast ratio at the remote-end by of turning off one antenna and turning on another antenna, for example, by turning on and off the corresponding RTUs $302_1$-$302_8$ from the host-end. This arrangement requires the use of more RTUs $302_1$-$302_8$ and more antennas (502, 504, and 506) at the remote-end as compared to those utilized with a remote switching matrix (e.g., as depicted in FIG. 3). During idle network periods, the RTUs $302_1$-$302_8$ are dormant. As the network traffic at the location increases, the host switching matrix 110 can facilitate the sectorization/desectorization process by activating specific RTUs $302_1$-$302_8$. For example, during low traffic periods, RTU $302_1$ can be activated to utilize the single-beam antenna 502. In another example, during very high traffic periods, RTUs $302_1$-$302_8$ can be activated to utilize the multi-beam antenna 506. It is noted that an activated RTU is capable of sending and receiving data with a user equipment (e.g., via the corresponding antenna) and a dormant RTU is incapable of sending and receiving data with a user equipment until changed to active status.

Figure 6:
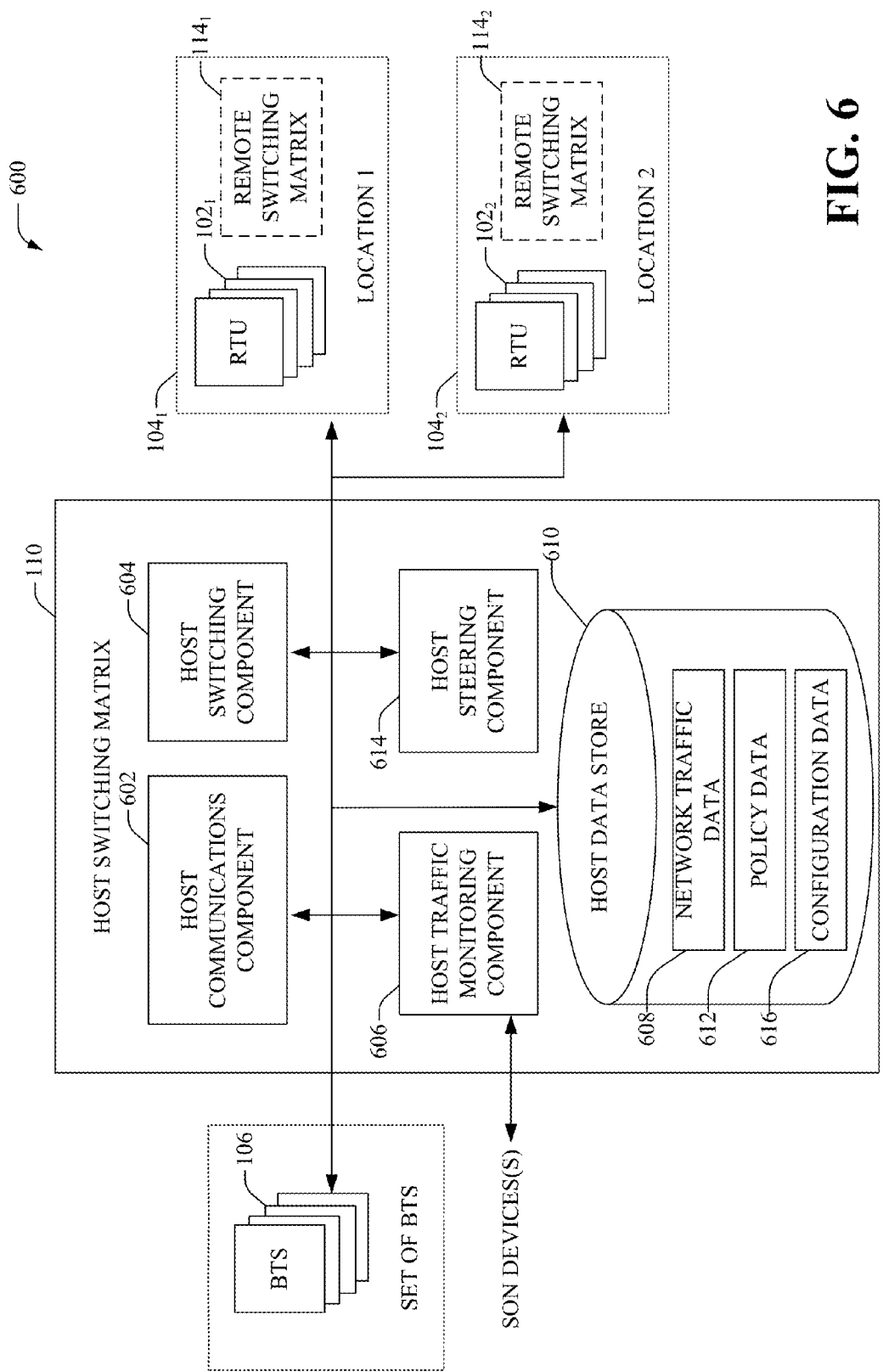
FIG. 6 illustrates an example system that comprises a host switching matrix for automated network capacity management.

FIG. 6 illustrates an example system 600 that comprises a host switching matrix for automated capacity management, according to an aspect of the subject specification. As an example, the host switching matrix 110 can reside within or be coupled to a BTS hotel. It can be noted that the BTSs 106, host switching matrix 110, remote switching matrices $114_1$-$114_2$, and RTUs $102_1$-$102_2$ can include functionality as more fully described herein, for example, as described above with regard to systems 100-500. In one aspect, the RTUs $102_1$-$102_2$ can be dynamically connected to different antenna ports via the remote switching matrices $114_1$-$114_2$. Alternatively, the remote switching matrices $114_1$-$114_2$ can be optional (as depicted by the dotted line) and the RTUs $102_1$-$102_2$ can be hard wired connected to antenna ports of different antennas.

According to an embodiment, the host switching matrix 110 can include a host communications component 602, a host switching component 604, a host traffic monitoring component 606, and/or a host data store 610. The host communications component 602 can exchange communications data with a set of BTSs 106. As an example, the communications data includes a radio simulcast. It is noted that the radio simulcast can provide a network signal and route network resources necessary for a RTU (e.g., RTUs $102_1$-$102_2$) to provide communication services to a user equipment. The host communications component 602 can further exchange the communications data with a set of activated RTUs $102_1$-$102_2$ to facilitate communication with one or more user equipment within the locations ($104_1$-$104_2$).

A host traffic monitoring component 606 can determine real-time (or substantially real-time) network traffic and/or traffic demands at the locations ($104_1$-$104_2$). In one aspect, the network traffic and/or traffic demand data can be received from one or more devices of a SON (e.g., SON devices 112) that monitor and/or predict changes network traffic at the locations ($104_1$-$104_2$). In another example, the host traffic monitoring component 606 can also determine network activity based on monitoring the exchange of communications data with the BTSs 106 and/or the RTUs $102_1$-$102_2$. The determined and/or received network traffic data 608 can be stored within the host data store 610 that resides within (or is coupled to) the host switching matrix 110. Further, the host switching matrix 110 can comprise a host switching component 604 that can dynamically activate or deactivate one or more of the RTUs $102_1$-$102_2$ based on an analysis of the network traffic data 608 and/or policy data 612 (e.g., time or day, date, event schedule, etc.). In one aspect, the simulcast combination for the RTUs $102_1$-$102_2$ can also be determined by the host switching component 604 and instructions to implement the specific simulcast combination can be transmitted (e.g., by the host switching component 604) to the remote switching matrices $114_1$-$114_2$ associated with the selected/activated RTUs $102_1$-$102_2$. In this example scenario, wherein remote switching matrices $114_1$-$114_2$ are utilized, the host switching component 604 can transfer simulcast ratio data to the remote switching matrices $114_1$-$114_2$, which in turn can adjust the simulcast ratio of the RTUs $102_1$-$102_2$ from n:1 to 1:1 back to n:1 by making dynamic RF connections between the RTUs $102_1$-$102_2$ and the antenna ports in the specified simulcast combination. For example, as the traffic demands at the location increase, the host switching component 604 can instruct the remote switching matrices $114_1$-$114_2$ to increase sectorization of the antennas, for example, by converting an omni site into a three sectored site, and progressively to a six sectored site, twelve sectored site, twenty four sectored site, etc. (and vice versa).

Alternatively, in another example scenario wherein remote switching matrices $114_1$-$114_2$ are not utilized, the host switching component 604 can determine antennas to which the RTUs $102_1$-$102_2$ are coupled to (e.g., via hard connections), for example based on configuration data 616 stored in the data store (or received from the RTUs $102_1$-$102_2$). Further, the host switching component 604 can determine which antenna is to be activated based on the network traffic data 608 and/or policy data 612 and accordingly activate the corresponding RTUs $102_1$-$102_2$. Additionally (or optionally), the host switching matrix 110 can comprise a host steering component 614 that facilitates beam steering of the multi-beam antennas (e.g., coupled to the RTUs 102₁-102₂) such that antenna beams of the multi-beam antennas are steered or rotated through the coverage area of the multi-beam antennas' based on where the traffic is located (or traffic demand is the greatest). The location of the traffic can be received by the host traffic monitoring component 606, for example, from the SON devices (e.g., SON devices 112).

Figure 7:
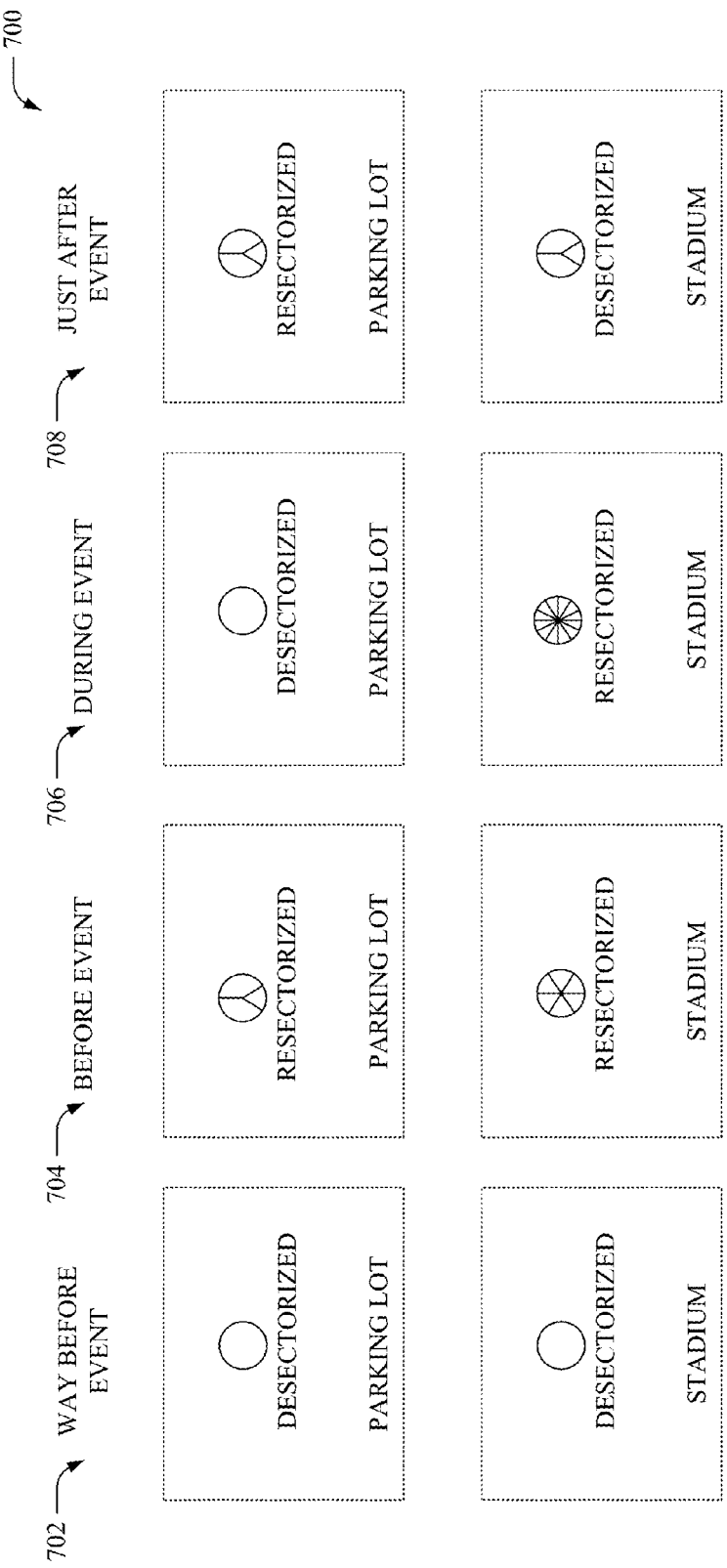
FIG. 7 illustrates an example diagram that depicts sectorization and desectorization of a venue by utilization of a remote switching matrix and/or a host switching matrix.

FIG. 7 illustrates an example diagram 700 that depicts sectorization and desectorization of a venue in accordance with the subject embodiments. In this example scenario, sectorization and desectorization of antennas deployed at a stadium and a parking lot of the stadium is illustrated. As an example, during an event (e.g., football game) stadiums can hold crowds of up to 95,000 people—the size of a small city. However, after the event, the stadiums remain empty most of year (e.g., during off-season). Further, during the pre-game large crowds can gather around the stadium, for example, in the parking lots for tailgating. The crowd then moves into the stadium to watch the game, for example, at kickoff, and again the crowd moves back in the parking lot as the stadium empties after the game has ended. To avoid and/or impede a situation wherein network at a stadium starts to congest because the venue site has run out of sector carriers, DL codes, and/or DL power, sectorization and desectorization of RTUs deployed at the venue site can be controlled by employing a remote switching matrix 114 (and/or a host switching matrix 110).

As illustrated at 702, several days/hours before the event (e.g., during off-season, on non-event days, etc.), both the parking lot and the stadium can be desectorized (e.g., since network traffic demand is below a defined threshold). In one example, the host switching matrix 110 can deactivate the RTUs deployed at the parking lot and the stadium, for example, based on determining that there is no traffic (or minimal traffic) at the both the venues. At 704, just before the event, as crowds start entering the parking lot and/or the stadium, the host switching matrix 110 can activate one or more of the RTUs. Further, the remote switching matrix 114 (and/or the host switching matrix 110) can adjust the sectorization of the activated RTUs and modify simulcast ratios based on the observed (and/or expected) traffic at the venues. For example, as shown at 704, RTUs at both the parking lots and the stadium can be resectorized (e.g., since network traffic demand is within a first defined range).

During the event, the crowd moves into the stadium and typically, the parking lot is empty. Accordingly, at 706, the host switching matrix 110 can deactivate one or more of the RTUs at the parking lot and the remote switching matrix 114 (and/or the host switching matrix 110) can adjust the simulcast ratios of the active RTUs based on the observed (and/or expected) increase in traffic at the stadium (e.g., network traffic demand is within a second defined range). For example, the remote switching matrix 114 can increase the number of sectors by adjusting the simulcast ratio and thus provide more DL codes and/or DL power to support the high traffic demands in the stadium. At 708, just after the event, the crowd starts moving out of the stadium and back into the parking lot. During this time, the host switching matrix 110 can activate one or more of the RTUs at the parking lot and the remote switching matrix 114 (and/or the host switching matrix 110) can adjust the simulcast ratios of the active RTUs at the parking lot and the stadium based on the observed (and/or expected) decrease in traffic at the stadium (e.g., network traffic demand is within a third defined range). Additionally or alternatively, timing data (e.g., kickoff time, concert duration, etc.) associated with the event can be utilized by the remote switching matrix 114 and/or the host switching matrix 110 to facilitate sectorization and/or desectorization of the RTUs.

Figure 8:
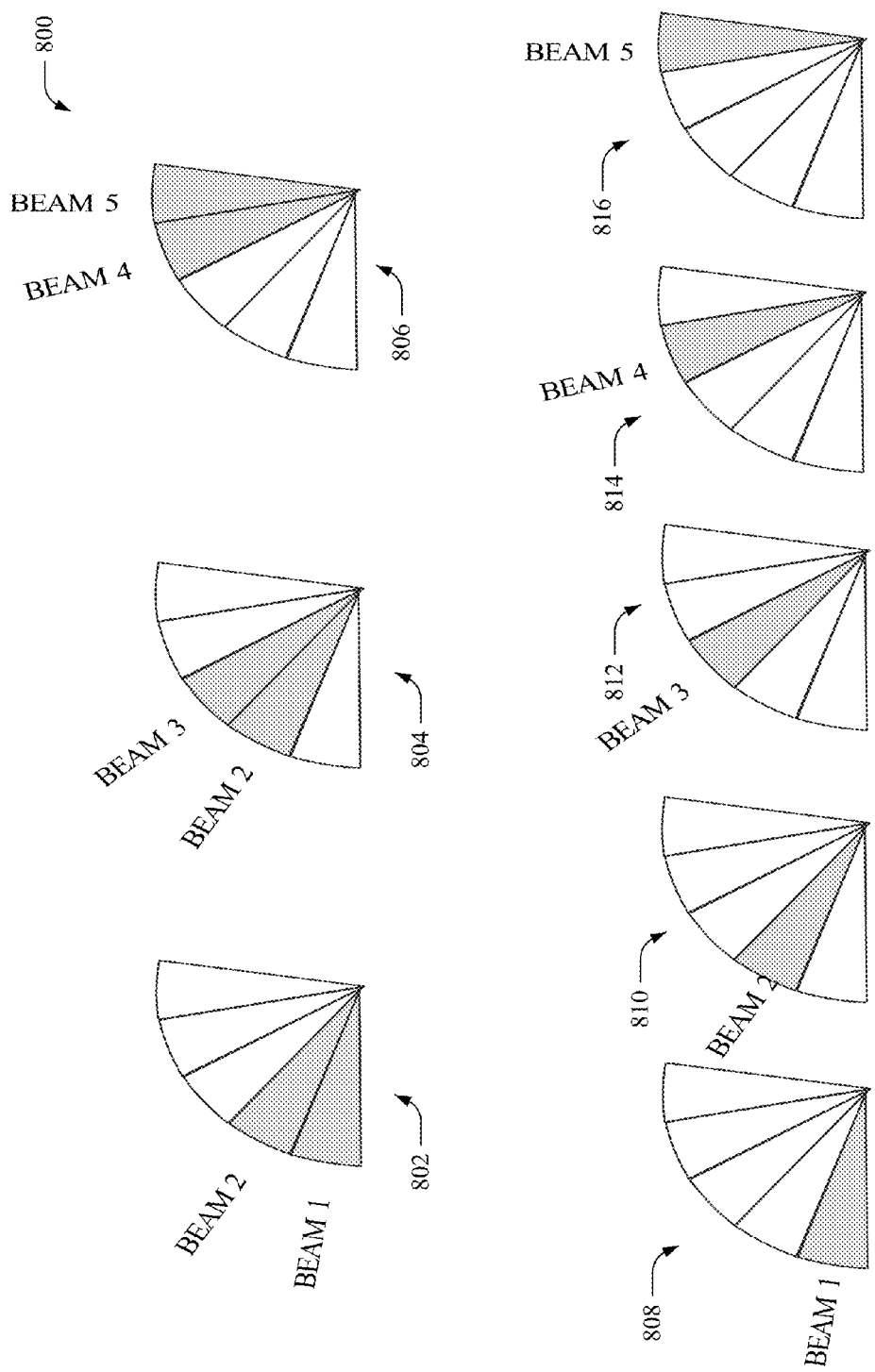
FIG. 8 illustrates an example diagram that depicts remote azimuth steering implemented by a remote switching matrix and/or a host switching matrix.

FIG. 8 illustrates an example diagram 800 that depicts remote azimuth steering in accordance with the subject embodiments. As discussed in detail above, the remote switching matrix 114 (e.g., via the steering component 414) and/or the host switching matrix 110 (e.g., via the host steering component 614) can facilitate beam steering of a multi-beam antenna deployed at a venue. In one aspect, the remote switching matrix 114 and/or the host switching matrix 110 can remotely steer the antenna beams based on location of the traffic (e.g., received from SON devices). For example, the antenna beam can be steered to cover a location, which has the highest concentration of UE and/or traffic demand (e.g., a specific room of a convention center where an event is being held, concession stands at a stadium during half time, etc.). In one aspect, based on an analysis of the network traffic data, the remote switching matrix 114 (and/or the host switching matrix 110) can instruct a multi-beam antenna, coupled to an activated RTU, to change a direction of the main lobe of a radiation pattern, for example, by switching the antenna elements and/or by changing the relative phases of the RF signals driving the antenna elements. Accordingly, the antenna beams can be focused on a portion of the coverage area of the multi-beam antenna that has the highest amount of traffic instead of covering the entire coverage area.

As an example, one or more antenna beams can be remotely steered/rotated by the remote switching matrix 114 (and/or the host switching matrix 110). Referring back to FIG. 8, 802-806 illustrates steering of two beams, while 808-816 illustrates steering of a single-beam of the multi-beam antenna towards an area that has the highest concentration of user equipment and/or user density.

Figure 9:
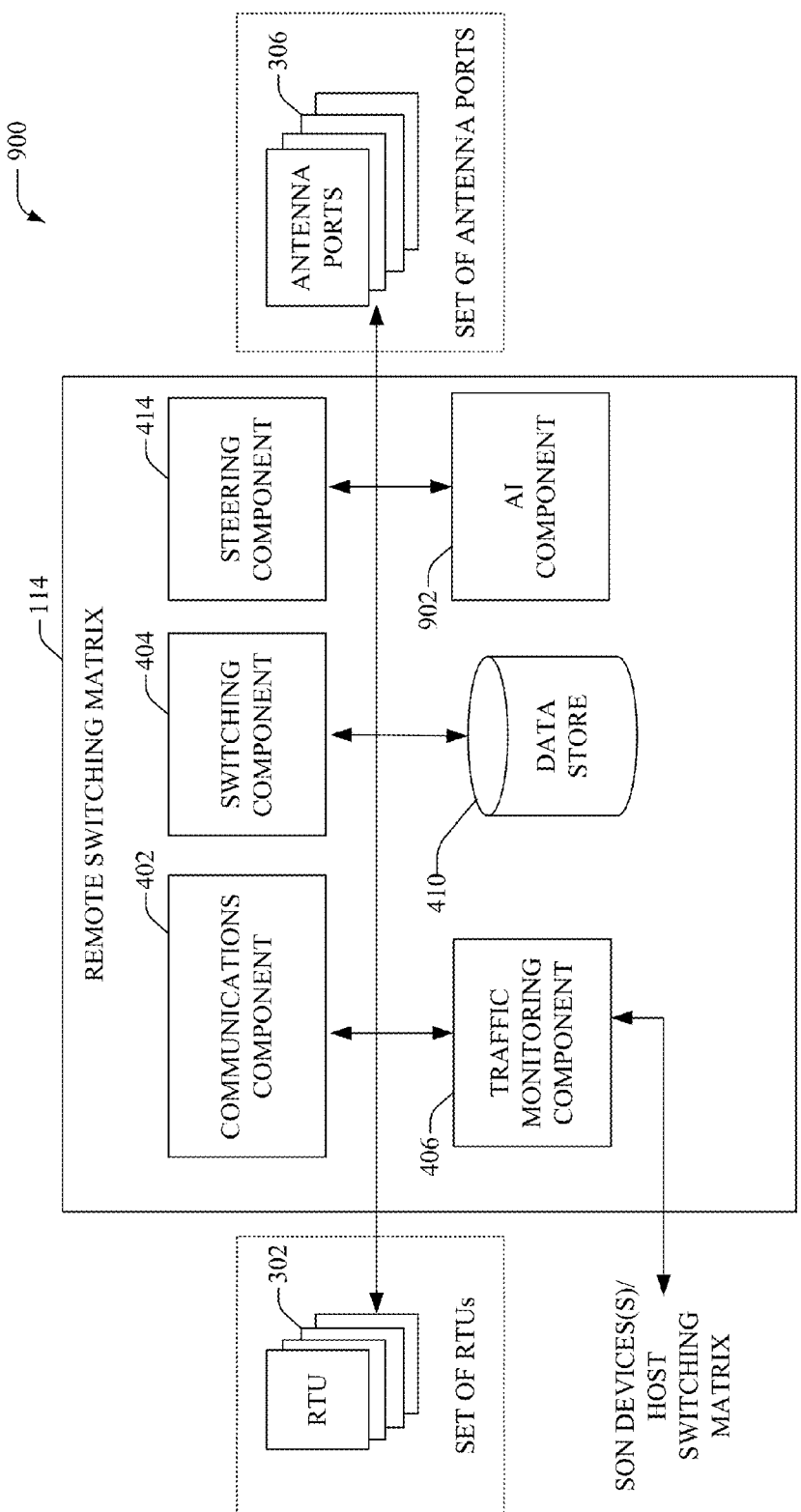
FIG. 9 illustrates an example system that facilitates automating one or more features in accordance with the subject embodiments.

Referring now to FIG. 9, there illustrated is an example system 900 that employs one or more artificial intelligence (AI) components 902, which facilitate automating one or more features in accordance with the subject embodiments. It can be appreciated that the remote switching matrix 114, the set of RTUs 302, the set of antenna ports 306, the communications component 402, the switching component 404, the traffic monitoring component 406, the data store 410, and the steering component 414 can include respective functionality, as more fully described herein, for example, with regard to systems 100-600.

In an example embodiment, system 900 (e.g., in connection with automatically determining simulcast ratios, parameters for sectorization/desectorization and/or beam steering, etc.) can employ various AI-based schemes for carrying out various aspects thereof. For example, a process for determining an optimal time/schedule to change simulcast ratios, steering of a beam of a multi-beam antenna, etc. can be facilitated via an automatic classifier system implemented by AI component 902. A classifier can be a function that maps an input attribute vector, $x=(x1,x2,x3,x4,xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information received from SON devices, UEs, and/or macro access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing traffic patterns, UE behavior, user/operator preferences, historical information, receiving extrinsic information, network load/congestion trends, type of UE, etc.). For example, SVMs can be configured via a learning or training phase within a classifier constructor and feature selection module. Thus, the classifier(s) of AI component 902 can be used to automatically learn and perform a number of functions, including but not limited to determining according to a predetermined criteria when and/or what simulcast ratios are to be implemented, when and/or where one or more beams of a multi-beam antenna are to be steered, etc. The criteria can include, but is not limited to, historical patterns and/or trends, user preferences, service provider preferences and/or policies, location of the RTUs, current time, network load, and the like.

Figure 10:
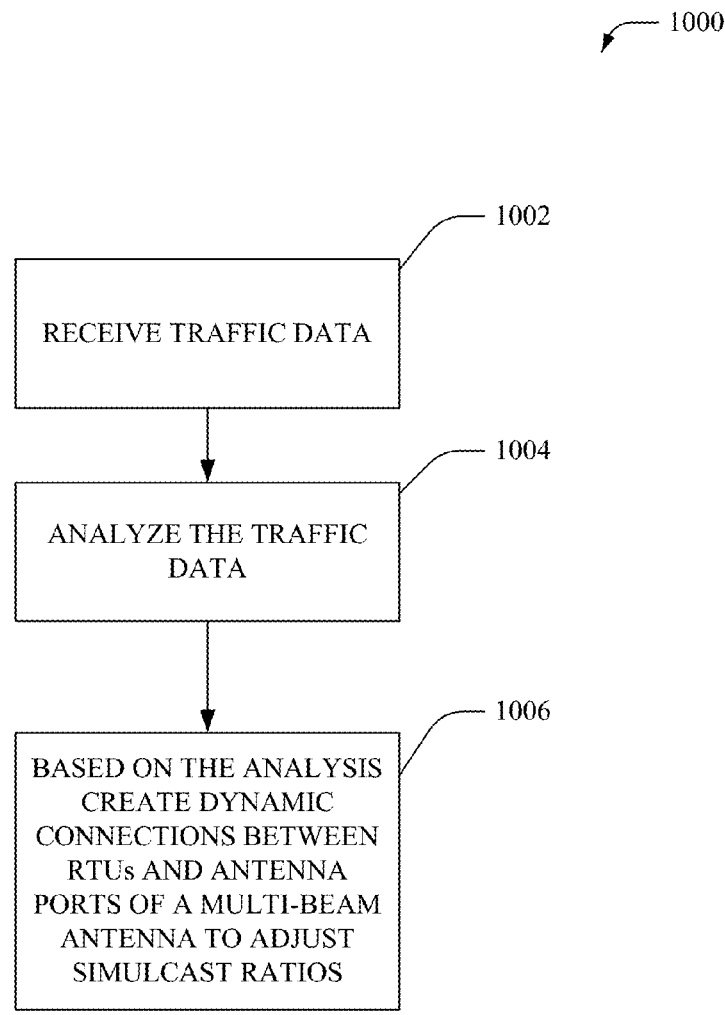
FIG. 10 illustrates an example method that facilitates efficient network capacity management based on control of simulcast ratios.
Figure 11:
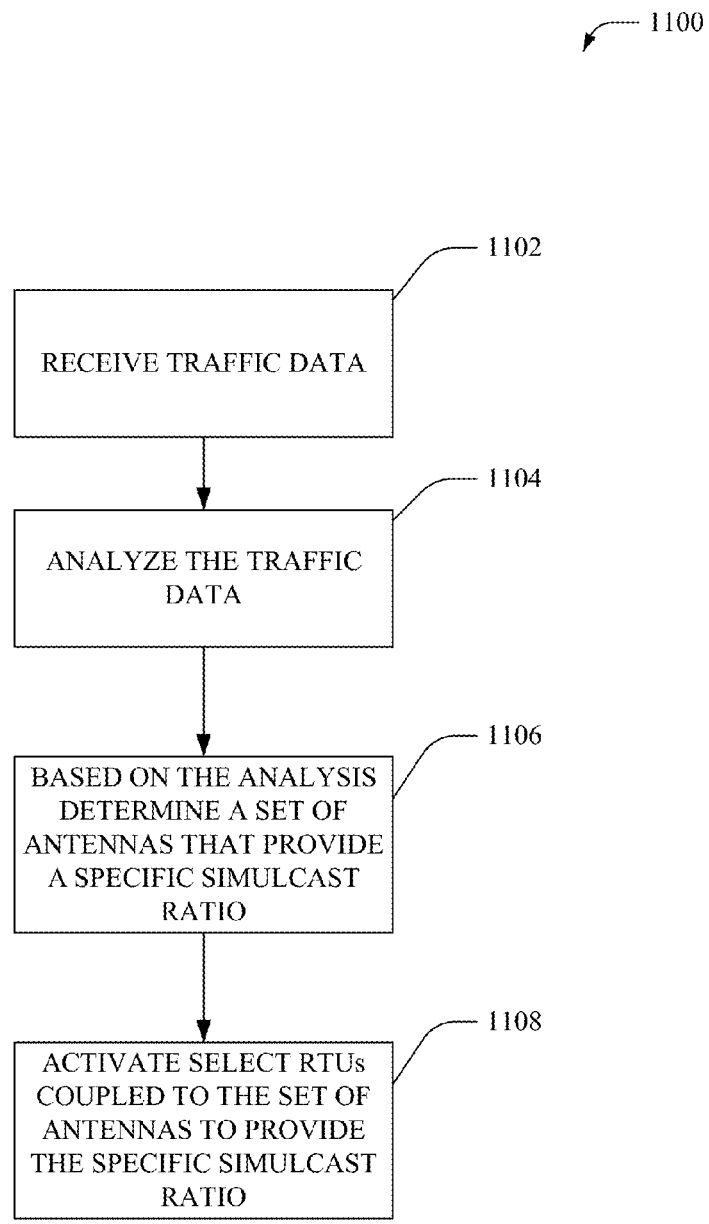
FIG. 11 illustrates an example method for determining sectorization and/or desectorization of a network area based on real-time (or near real time) network load.

FIGS. 10-11 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 10, illustrated is an example method 1000 that facilitates efficient network capacity management based on control of simulcast ratios, according to an aspect of the subject disclosure. As an example, method 1000 can be implemented by a remote switching matrix that can be deployed at a venue and can be utilized to couple RTUs with different antenna ports, for example of one or more multi-beam antennas. At 1002, traffic data can be received, for example, from one or more devices of a SON. As an example, the traffic data can represent the number of user equipment at the venue, the network traffic/load and/or traffic demand at a macro access point deployed at the venue, etc. At 1004, the traffic data can be analyzed. For example, a simulcast ratio to support the traffic demand can be determined based on the analysis. Further, at 1006, dynamic connections can be made between the RTUs and the antenna ports to achieve and/or implement the determined simulcast ratio. In one aspect, if the traffic at the venue is determined to have increased, the simulcast ratio can be increased from n:1 to 1:1. In other words, as the traffic at the venue increases, the number of antenna sectors can be increased (and vice versa).

FIG. 11 illustrates an example method 1100 for determining sectorization and/or desectorization a network area based on real-time (or near real time) network load, according to an aspect of the subject disclosure. As an example, method 1100 can be implemented by a host switching matrix deployed at (and/or coupled to) a BTS hotel. In one aspect, the host switching matrix can couple BTS equipment of the BTS hotel to sets of RTUs deployed at different locations. A set of the RTUs can be hard-wired to respective antenna ports of different antennas (e.g., a single-beam antenna, a twin-beam antenna, a multi-beam antenna, etc.). At 1102, traffic data can be received, for example, from one or more devices of a SON. As an example, the traffic data can represent the number of user equipment at the location, the network traffic/load and/or traffic demand at a macro access point deployed at the location, etc. Further, at 1104, the traffic data can be analyzed. For example, a simulcast ratio that supports the traffic demand can be determined based on the analysis. At 1106, based on the analysis, a set of the antennas, deployed at the location, that can provide the determined simulcast ratio can be identified. For example, it can be determined whether a single-beam antenna, a twin-beam antenna, or a multi-beam antenna is to be utilized to provide the determined simulcast ratio. At 1108, RTUs that are hard-wired to the selected antennas can be determined and activated. As network traffic changes, the set of RTUs that are activated/deactivated can be adjusted to provide different simulcast ratios that support the changes in the network traffic.

Figure 12:
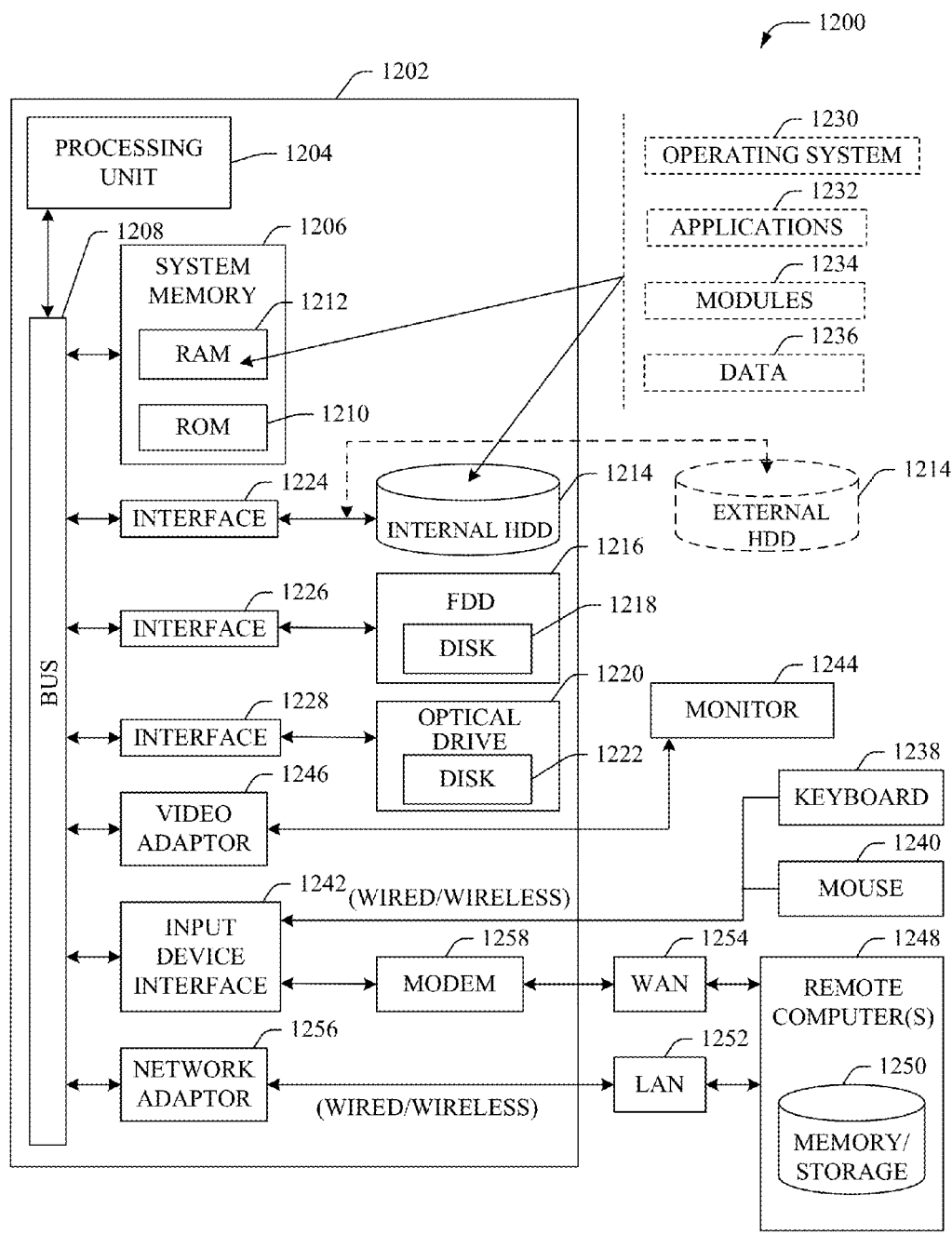
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), server(s), equipment, system(s), and/or device(s) (e.g., RTUs $102_1$-$102_N$, RTUs $302_1$-$302_8$, RTUs 302, BTS equipment 106, BTS hotel 108, BTS hotels $108_1$-$108_4$, host switching matrix 110, SON device(s) 112, remote switching matrix 114, remote switching matrices $114_1$-$114_N$, multi-beam antenna 304, communications component 402, switching component 404, traffic monitoring component 406, data store 410, steering component 414, single-beam antenna 502, twin-beam antenna 504, multi-beam antenna 506, host communications component 602, host switching component 604, host traffic monitoring component 606, host steering component 614, host data store 610, AI component 902, etc.) disclosed herein with respect to system 100-600 and 900 can each include at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated, but which may be integrated into a UE in some embodiments). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
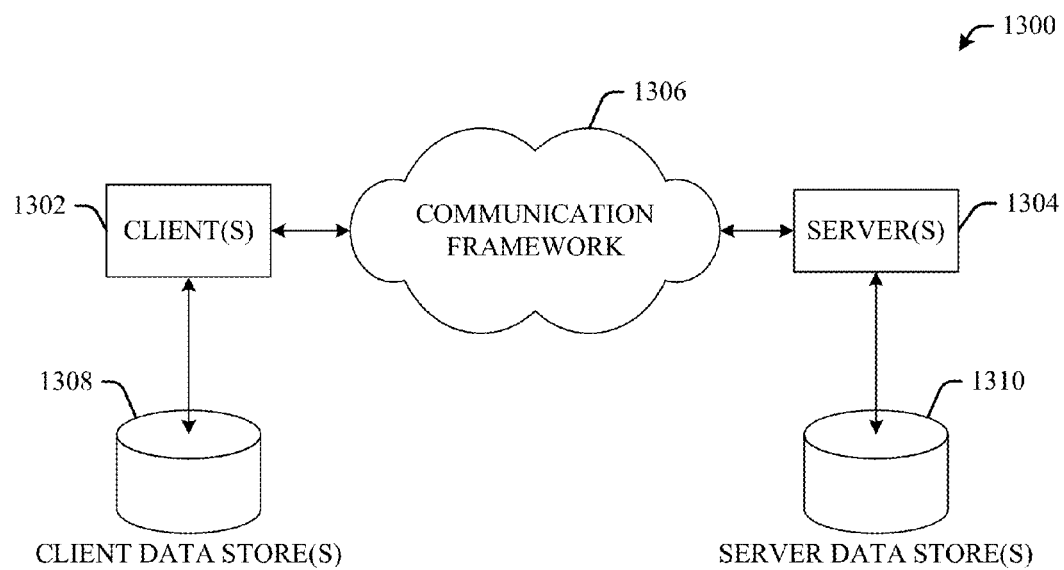
FIG. 13 illustrates a schematic block diagram of an exemplary computing environment in accordance with the subject innovation.

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices).

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining traffic data representing a change in traffic in an area served by network devices;
based on the traffic data, adjusting a ratio of active to dormant remote transceiver devices determined to be deployed within the area by adjusting a first coupling of physical connections of base transceiver station devices to the remote transceiver devices via a host switching device; and
based on the traffic data, modifying a simulcast ratio of the remote transceiver devices, wherein the modifying comprises modifying a second coupling of the remote transceiver devices with antenna ports of antennas, determined to be deployed in the area, via a remote switching device.

2. The system of claim 1, wherein the adjusting the first coupling comprises, in response to an increase in traffic in the area, coupling a physical connection of a remote transceiver device of the remote transceiver devices to the base transceiver station devices.

3. The system of claim 1, wherein the adjusting the first coupling comprises, in response to a decrease in traffic in the area, decoupling a physical connection of a remote transceiver device of the remote transceiver devices from the base transceiver station devices.

4. The system of claim 1, wherein the operations further comprise:
based on the traffic data, determining a location of increased traffic in the area; and
steering an antenna beam of a multi-beam antenna of the antennas to the location.

5. The system of claim 1, wherein the antennas are part of an outdoor distributed antenna system.

6. The system of claim 1, wherein the modifying the second coupling comprises, in response to an increase in traffic in the area, establishing a connection between a remote transceiver device of the remote transceiver devices and an antenna port of the antenna ports.

7. The system of claim 1, wherein the modifying the second coupling comprises, in response to a decrease in traffic in the area, terminating a connection between a remote transceiver device of the remote transceiver devices and an antenna port of the antenna ports.

8. The system of claim 1, wherein a coupling of the second coupling comprises a physical connection.

9. The system of claim 1, wherein a coupling of the second coupling comprises a radio frequency connection.

10. A method, comprising:
determining, by a system comprising a processor, traffic data representing a change in traffic in an area served by network devices;
based on the traffic data, adjusting, by the system, a ratio of active to dormant remote transceiver devices determined to be deployed within the area, wherein the adjusting comprises adjusting a coupling of first couplings of physical connections of a group of base transceiver station devices to the remote transceiver devices via a first switching matrix device; and
based on the traffic data, modifying, by the system, a simulcast ratio of the active remote transceiver devices, wherein the modifying comprises modifying second couplings of the active remote transceiver devices with antenna ports of antennas, determined to be deployed in the area, via a second switching matrix device that is remote from the first switching matrix device.

11. The method of claim 10, wherein the adjusting the coupling comprises, in response to an increase in traffic in the area, coupling a physical connection of a remote transceiver device of the remote transceiver devices to the group of base transceiver station devices.

12. The method of claim 10, wherein the adjusting the coupling comprises, in response to a decrease in traffic in the area, decoupling a physical connection of a remote transceiver device of the remote transceiver devices from the group of base transceiver station devices.

13. The method of claim 10, further comprising:
based on the traffic data, determining, by the system, a location of increased traffic in the area; and
modifying, by the system, a direction of a beam of a multi-beam antenna of the antennas to the location.

14. The method of claim 10, wherein the modifying comprises modifying the simulcast ratio to facilitate splitting of sectors associated with the antennas in accordance with the traffic data.

15. The method of claim 10, wherein the modifying comprises, in response to an increase in traffic in the area, establishing a connection between a remote transceiver device of the remote transceiver devices and an antenna port of the antenna ports.

16. The method of claim 10, wherein the modifying comprises, in response to a decrease in traffic in the area, terminating a connection between a remote transceiver device of the remote transceiver devices and an antenna port of the antenna ports.

17. A non-transitory machine-readable storage medium, comprising executable instructions that, when executed by a processor, facilitate performance of operations, comprising:
determining traffic data representing a change in traffic in an area to which service is provided by network devices;
based on the traffic data, adjusting a ratio of active to dormant remote transceiver devices determined to be deployed within the area by adjusting physical connections of base transceiver station devices to the remote transceiver devices via a host switching matrix device; and
based on the traffic data, updating a coupling of a remote transceiver device of the remote transceiver devices with an antenna port of an antenna, determined to be deployed in the area, via a remote switching matrix device that is remote from the host switching matrix device.

18. The non-transitory machine-readable storage medium of claim 17, wherein the adjusting the physical connections comprises, in response to determining an increase in traffic in the area, establishing a physical connection, of the physical connections, between a remote transceiver device of the remote transceiver devices and a base transceiver station device of the base transceiver station devices.

19. The non-transitory machine-readable storage medium of claim 17, wherein the adjusting the physical connections comprises, in response to determining a decrease in traffic in the area, decoupling a physical connection, of the physical connections, between a remote transceiver device of the remote transceiver devices and a base transceiver station device of the base transceiver station devices.

20. The non-transitory machine-readable storage medium of claim 17, wherein the operations further comprise:
   based on the traffic data, determining a location of increased traffic in the area; and
   redirecting an antenna beam of the antenna to the location.

* * * * *